United States Patent [19]

Nausedas

[11] Patent Number: 4,593,433
[45] Date of Patent: Jun. 10, 1986

[54] STUFFING APPARATUS AND METHOD
[75] Inventor: Joseph A. Nausedas, Oak Forest, Ill.
[73] Assignee: Union Carbide Corporation, Danbury, Conn.
[21] Appl. No.: 709,909
[22] Filed: Mar. 8, 1985

Related U.S. Application Data

[63] Continuation-in-part of Ser. No. 675,183, Nov. 27, 1984, abandoned.
[51] Int. Cl.[4] .............................................. A22C 11/02
[52] U.S. Cl. .......................................... 17/49; 17/41; 17/35
[58] Field of Search ................ 17/35, 41, 42, 49; 53/576

[56]  References Cited
U.S. PATENT DOCUMENTS

| | | |
|---|---|---|
| 792,650 | 6/1905 | Cordes . |
| 1,043,241 | 11/1912 | Louden, Sr. . |
| 1,745,254 | 1/1930 | Green . |
| 3,115,668 | 12/1963 | Townsend ............................ 17/33 |
| 3,150,410 | 9/1964 | Washburn ............................ 17/35 |
| 3,191,222 | 6/1965 | Townsend ............................ 17/33 |
| 4,306,334 | 12/1981 | Niedecker ......................... 17/42 X |
| 4,343,603 | 8/1982 | Pavlow et al. .................... 425/114 |
| 4,358,873 | 11/1982 | Kullross .......................... 17/41 X |

Primary Examiner—Willie G. Abercrombie
Attorney, Agent, or Firm—Roger Aceto

[57] ABSTRACT

A stuffing apparatus including a loading/unloading device for casing articles of the type which includes a replaceable, and preferably disposable, stuffing tube having a shirred casing supply predisposed on the tube. The device moves the casing article into a stuff position and thereafter, when the casing supply has been stuffed, reverses direction to remove the stuffing tube from the stuff position.

16 Claims, 8 Drawing Figures

STUFFING APPARATUS AND METHOD

BACKGROUND OF THE INVENTION

This is a continuation-in-part of Ser. No. 675,183, filed Nov. 27, 1984, now abandoned.

The present invention relates generally to a stuffing apparatus and method, and more particularly, to an apparatus and method for moving a casing article, constituting a stuffing tube and a casing supply on the tube, to a stuff position. Thereafter, when the casing supply has been stuffed and removed from the tube, the apparatus removes the stuffing tube from the stuff position to a discharge position. At the discharge position the tube is discarded in an outboard direction and over the side of the stuffing machine.

Stuffing machines customarily use casings in the form of a shirred casing stick which is placed over the stuffing horn of the machine. U.S. Pat. Nos. 3,115,668 and 3,191,222 show typical stuffing machines including means for automatically loading and shirring casing stick onto the stuffing horn of the machine.

Another type of stuffing machine uses a casing article comprising a replacable stuffing tube which carries a shirred casing supply gripped about the tube. U.S. Pat. No. 4,489,460 shows a casing article loading and unloading device for such a stuffing machine. In particular, the device illustrated in this application is a revolving turret. The turret receives casing articles from a supply and then moves in a step wise fashion to a stuff position. After stuffing, the turret steps again to move the stuffing tube (now depleted of casing) to a discharge position. The turret is designed to rotate in a stepwise fashion so that as one casing article is loaded onto the turret at the load position, a casing article previously loaded onto the turret is indexed to the stuff position, while at the same time, a spent stuffing tube is indexed to a position where it is discharged.

The present invention seeks to simplify the loading and unloading operation by providing a loading device which swings back and forth between the load, stuff, and discharge positions, thereby shortening the sequencing time and simplifying the elements otherwise required for rotating the carrier a full 360°.

SUMMARY OF THE INVENTION

In one aspect thereof, the present invention may be characterized by a stuffing apparatus having a longitudinal stuffing axis along which casing articles are positioned for stuffing and having means to deliver articles towards and away from the stuffing axis, said means comprising:

(a) a carrier having a cradle portion adapted to receive a shirred casing article composed of an elongated stuffing tube and a shirred casing predisposed on the tube, and for positioning the received casing article so its longitudinal axis lies substantially parallel to the stuffing axis;

(b) means for moving said carrier from a casing article receiving position and towards said stuffing axis to locate the longitudinal axis of the received casing article substantially coincident with the stuffing axis so an end of the stuffing tube can be connected to an outlet of the stuffing apparatus, and for moving the carrier in a reverse direction away from the stuffing axis and towards the receiving position after the shirred casing on the stuffing tube has been stuffed and removed from the stuffing tube;

(c) ejector means on the carrier and spaced from the cradle portion, the ejector means being movable with respect to the carrier between an inoperative position and an operative position extending outward from the carrier and engageable against the stuffing tube;

(d) means to locate the ejector means at the operative position prior to movement of the carrier in the reverse direction, and the ejector means being maintained in the operative position to engage and transport the stuffing tube on the carrier away from the stuffing axis as the carrier moves in the reverse direction.

(e) discharge means causing the release and removal of the stuffing tube from the carrier as the carrier moves in the reverse direction away from the stuffing axis; and (f) means for moving the ejector means to the inoperative position prior to movement of the carrier in the forward direction.

In its method aspect, the present invention may be characterized by the steps of:

(a) receiving an elongated casing article onto a carrier and supporting the article with its longitudinal axis parallel to and laterally spaced from a stuffing axis of a stuffing machine, the casing article constituting an elongated stuffing tube and a shirred casing on the tube having the pleats thereof gripping about the tube;

(b) moving the casing article transverse to its longitudinal axis from the receiving position and towards the stuffing axis until the longitudinal axis of the casing article coincides with the stuffing axis;

(c) holding the casing article at the stuffing axis and communicating an end of the stuffing tube to a stuffing outlet of the stuffing machine and thereafter releasing the casing article from the carrier and passing foodstuff through the outlet and into the stuffing tube to stuff and remove casing from the stuffing tube;

(d) disconnecting the stuffing tube from the outlet after all of the casing has been stuffed and removed from the tube;

(e) returning the stuffing tube to the carrier and moving the carrier and the stuffing tube in a reverse direction away from the stuffing axis and back towards the receiving position; and (f) discarding the stuffing tube from the carrier in the course of moving the stuffing tube in the reverse direction.

DESCRIPTION OF THE PREFERRED EMBODIMENT

Figure 1:
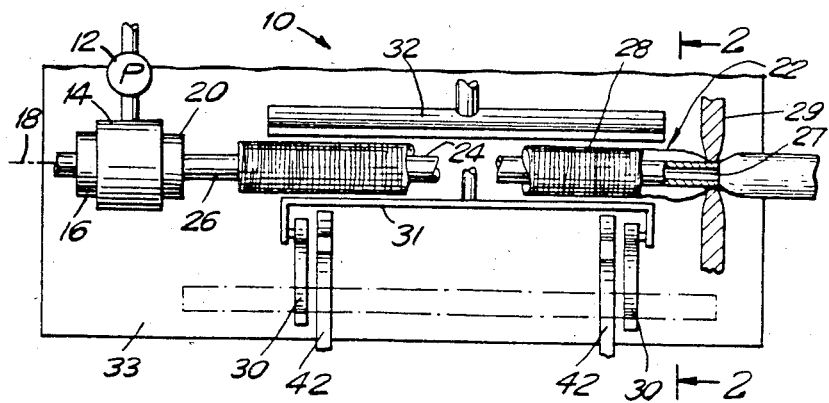
FIG. 1 is a schematic representation, in plan view, of a stuffing machine incorporating the casing article loading device of the present invention.

Referring to FIG. 1 there is shown a diagramatic representation of a stuffing machine, generally indicated at 10, incorporating the loading device of the present invention. Components of the stuffing machine will not be described except as may be necessary to an understanding of the present invention.

The stuffing machine is generally of the type wherein the stuffing horn is not a machine component. Instead, the machine uses a replaceable stuffing tube which has a supply of the casing to be stuffed predisposed on the tube. Machines of this general type are more particularly described in the aforementioned U.S. Pat. No. 4,489,460 and in a copending application Ser. No. 566,786 filed Dec. 29, 1983. The stuffing machine includes a pump 12 which is connected to a source of food product (not shown). The discharge of the pump is connected to a manifold 14 including a sliding valve conduit 16.

The sliding conduit has a longitudinal axis 18 which defines the stuffing axis of the machine. One end 20 of the conduit defines the outlet through which the food product is pumped under pressure by pump 12.

FIG. 1 also shows a casing article generally indicated at 22, in a stuff position on the apparatus. The casing article includes an elongated stuffing tube 24. As seen in the Figure, stuffing tube 24 has its longitudinal axis aligned with the stuffing axis 18 of the machine, and has its aft 26 communicated with the outlet end 20 of the conduit. The fore end 27 of the stuffing tube is received in an emulsion seal member 29.

Casing article 22 also includes a supply of shirred casing 28 which is predisposed on the tube prior to the time it is put into the stuffing position shown in the Figure.

As set out hereinabove, the present invention includes a loading device capable of moving casing articles (stuffing tube plus shirred casing supplied predisposed on the tube) from a supply of casing articles to a position wherein the longitudinal axis of the article is coincident with the stuffing axis. The loading device holds the casing article at the stuff position while a communication is made between the stuffing tube end 26 and the conduit outlet end 20. After the casing supply on the tube is exhausted by the stuffing operation, the loading device removes and discards the stuffing tube and replaces the discarded stuffing tube with a new casing article.

In FIG. 1, the loading device is shown as comprising two carrier members 30. These carriers are positioned to receive a casing article from a supply hopper (not shown) suspended over the machine. For purposes of illustration, one casing article, as received from the hopper, is shown on the carrier in phantom line. The casing article on the carrier has its longitudinal axis oriented parallel to stuffing axis 18. However, it should be understood that a casing article is not received on the carriers while another casing article is in the stuff position.

With the valve conduit 16 moved to the left as viewed in FIG. 1, the carriers 30 swing the casing article from the receiving position as shown in dotted line, to a position where its longitudinal axis is coincident with the stuffing axis 18 of the machine. This movement is transverse to the longitudinal axis of the casing article and a link member, schematically shown at 31, swings both carriers 30 in concert towards stuffing axis 18.

At the stuff position, the carriers 30, together with a cooperating clamp member shown at 32, hold the casing article while the valve conduit 16 moves to the right, as viewed in FIG. 1, to thereby effect a communication between the stuffing tube aft end 26 and the conduit oulet 20. Conduit 16 continues to moves and slides the casing article forward until the fore end 27 of the stuffing tube is received in the emulsion seal member 29.

The clamp and carriers then move apart a small distance to release the casing article and to permit stuffing of the casing. During stuffing, the casing can be rotated about its longitudinal axis, as shown for example in the aforementioned Ser. No. 566,786 the disclosure of which is incorporated herein by reference. The clamp and carriers, being positioned a small distance from the casing article, will act as vibration damping means as the casing article rotates.

After the casing has been stuffed, the carriers 30 and clamp 32 move together about the stuffing tube 24. This holds the stuffing tube while the conduit moves to the left, as viewed in FIG. 1, to disconnect the fore and aft ends of the stuffing tube from the emulsion seal member 29 and the conduit outlet 20 resepectively. The stuffing tube is returned to the carriers which move back to the load or receiving position. In the process of returning to the receiving position, ramps 42 lift the stuffing tube from the carriers and cause the tube to be discarded over the side of the stuffing machine and away from the stuffing axis.

Figure 2:
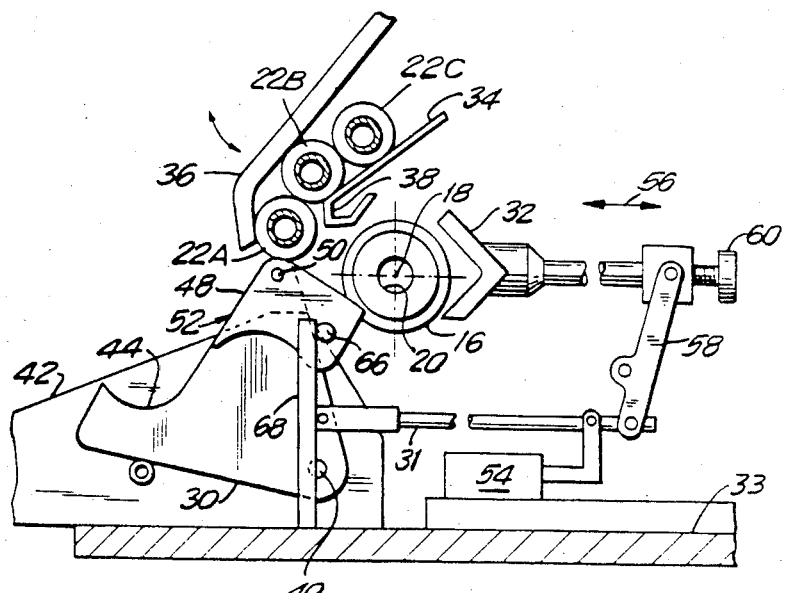
FIG. 2 is a view taken along the line 2—2 of FIG. 1 and showing the loading device at the start of the loading operation, other components of the stuffing machine being omitted for clarity; and, FIGS. 3-8 are similar to FIG. 2 showing the loading device at various operating positions.

More details of the loading device and its sequence of operation will be understood with reference to FIGS. 2-8. Referring first to FIG. 2 the longitudinal stuffing axis of the machine is identified at 18. Accordingly, the conduit 16 and its outlet 20 are both shown in end view. It should be appreciated that, for purposes of clarity and for simplifying the description other components of the stuffing machine, such as the pump and the structure for supporting conduit 16 above the bed 33 of the machine, have been omitted.

Supported above the machine bed 33, is a tray for holding the casing articles, a portion of the tray being shown at 34. The casing articles 22A, 22B, 22C, etc., are arranged on the tray with the longitudinal axis of each article oriented substantially parallel to the stuffing axis 18 of the machine. Associated with the tray is a gate means 36. This gate is operable to feed casing articles one at a time, as required, over the edge 38 of the tray.

The two carriers 30 (FIG. 1) are identical so that only one will be described in detail. With reference again to FIG. 2, each carrier 30 is pivoted at 40 to one of the ramps 42 so that the carriers can swing in a vertical plane. Each carrier has a cradle portion 44 and a receiving portion 48. When the carrier is in the load or receiving position as shown in FIG. 2, the receiving portion 48 lies adjacent the tray edge 38.

Pivoted to the carrier at 50 is an ejector 52. When the carrier is at the receiving position as shown in FIG. 2, the ejector is in an in operative position and disposed out of the way so as not to interfere with the loading of a casing article onto the carrier. However, the ejector can move outwardly from the carrier to an operative position as will be described more fully hereinbelow.

A pneumatic piston 54, is connected to link 31 and provides a means for swinging the carriers 30 about pivot 40. It should be appreciated that this swinging action is in a vertical plane and is transverse to the stuffing axis 18 of the stuffing machine.

The loader device also includes clamp 32 which is slideably mounted for movement towards and away from the stuffing axis of the machine in the direction as indicated by arrow 56. This movement of clamp 32 is coordinated to the operation of carrier 30 by a lever 58 which operatively connects the clamp to piston 54. Thus, with the arrangement as shown in FIG. 2, operation of piston 54 will cause the carriers 30 and the clamp 32 to move together towards the stuffing axis 18 in a scissor type of action. An adjustment means, schematically represented by screw 60 can be used to adjust the relative motion of clamp 32 toward and away from the machine stuffing axis 18. The adjustment means 60 also is used as an adjustment to permit accomodation of a different diameter of casing article.

The operation of the loading device of the present invention will be described as beginning with carrier 30 in a position as shown in FIG. 2 and with the ejector 52 in an inoperative position. With the carriers 30 and ejectors 52 in this position, gate means 36 is operated to release casing article 22A over the tray edge 38. Piston 50 is also operated to begin the swinging action of carriers 30 in a clockwise direction towards the stuffing axis 18 of the machine as viewed in the FIGS. 2–4.

Figure 3:
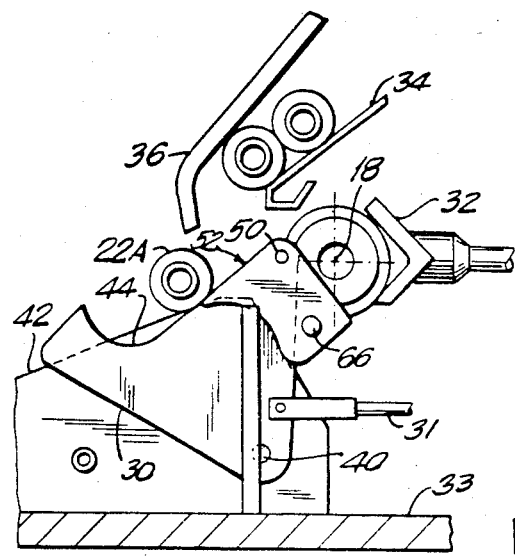
Figure 4:
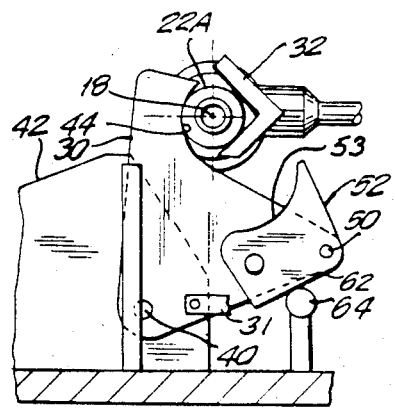

FIG. 3 shows the casing article 22A released and moving down ramp 42 towards cradle 44. The casing article 22A will eventually nest in cradle portions 44. The cradle portions 44 of the carriers 30 are aligned one to another and the movement of the carriers are coordinated as described hereinabove so that the longitudinal axis of casing article 22A is maintained substantially parallel with the machine stuffing axis 18 as the casing article is moved transverse to its longitudinal axis and laterally towards the stuffing axis 18 by the carriers 30. Thus, continued movement of carriers 30 in a clockwise direction about pivots 40 will eventually bring the casing article 22A to a position where its longitudinal axis is coincident with the stuffing axis 18 (FIG. 4). At this position, the clamp member 32, which also has been moving in a scissor action towards the stuffing axis 18, comes together with the cradle portion 44 to hold the casing article 22A at the stuffing position. With the casing article held in the stuffing position, conduit 16 is moved to the right as viewed in FIG. 1 to effect a communication between the outlet end 20 of the conduit and aft end 26 of the stuffing tube, and between the fore end 27 of the stuffing tube and emulsion seal member 29.

Once the connection is made, carriers 30 and clamp member 32 are moved apart slightly to free the casing so that the casing can be drawn off of the stuffing tube during the stuffing operation. As mentioned hereinabove, it then is also possible to rotate the stuffing tube and the casing article during the stuffing operation as is described for example in copending application Ser. No. 566,786.

At the end of the stuffing operation, when all of the casing has been stuffed and removed from the stuffing tube, the carriers and clamp member are again moved together to clamp about the stuffing tube. This holds the tube while conduit 16 is moved to the left as viewed in FIG. 1 to disconnect the outlet and emulsion seal member from the stuffing tube. At this point the stuffing tube may fall back onto the carrier. However, the food emulsion at the ends of the stuffing tube may hold one or both ends of the tube at the stuffing axis and prevent the tube from dropping onto the carrier. The function of the ejector 52 is to insure that the stuffing tube is removed from the stuffing position.

Figure 5:
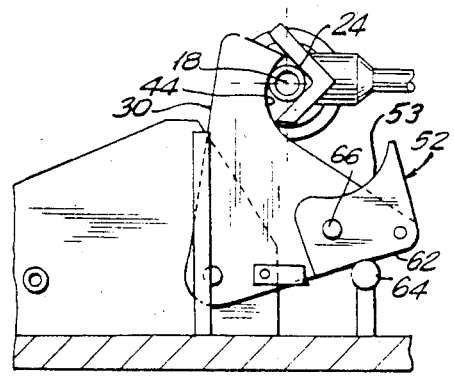
Figure 6:
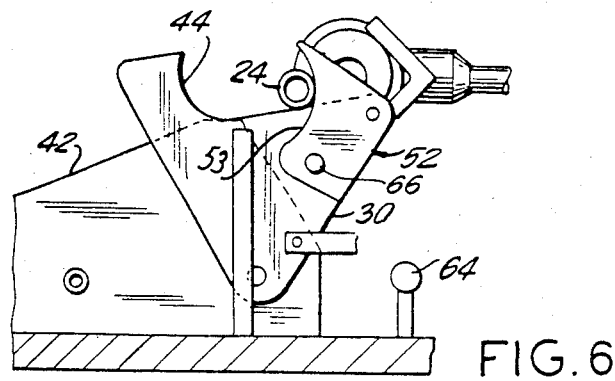

FIGS. 4 and 5 show that as carriers 30 approach the stuffing axis 18, a cam surface 62 on ejector 52 is carried against a fixed stop 64. This causes the ejector to pivot to the operative position shown in FIG. 5. In this position, the ejector extends outwardly from the carrier on the far side of the stuffing axis from cradle 44. With the ejector in this position, counter clockwise movement of the carrier (i.e. movement in a reverse direction) causes an engaging surface 53 on the ejector to contact the stuffing tube 24. This knocks the stuffing tube from the stuffing position, and allows the stuffing tube to fall back onto the carrier 30 as shown in FIG. 6.

Figure 7:
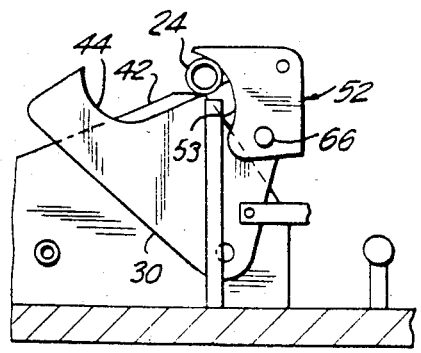
Figure 8:
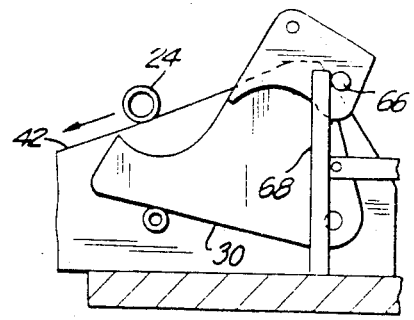

As the carrier continues to move in a counter clockwise direction, stuffing tube 24 will eventually contact ramp 42. As shown in FIG. 7, this causes the stuffing tube to lift from the carriers 30 as the carriers pass below the level of ramp 42, the stuffing tube. FIG. 8 shows the eventual disposition of the stuffing tube in that as the carrier returns the load position or casing article receiving position, the stuffing tube lifts free of the carrier and moves down the ramp to discharge in a direction over the side or outboard of the stuffing machine.

Also, FIG. 8 shows that as the carrier returns to the load position of FIG. 2, a cam follower 66 on the ejector engages fixed a cam member 68 on the stuffing machine. This returns the ejector to the inoperative position shown in FIG. 2 wherein the engaging surface 53 of the ejector is disposed within the boundaries of the carrier so as not to interfere with the subsequent reception and transport of a new casing article to the stuffing axis. Gate means 36 is then operated to release casing article 24B and the loading and unloading cycles are repeated.

The invention as described has the carriers 30 contacting the casing of the shirred casing article is order to transport the article to the stuffing position. This arrangement also facilitates movement of the ejector to the operative position as described. However, it should be appreciated that the carriers can be spaced further apart so they will contact only the stuffing tube of the casing article when moving the article into the stuffing position. If such an increased spacing is used, other means well within the skill of the art, would be needed in place of cam surface 62 and fixed stop 64 for moving the ejector to the operative position extending outwardly from the carriers.

As mentioned hereinabove, the present invention is intended for use in stuffing machine which use casing articles comprising a replacable stuffing tube. However, it should be appreciated that the present invention also can be used with a stuffing machine of the type shown in U.S. Pat. No. 3,115,668. In such use the loading device of the present invention would hold the casing article (tube plus casing on the tube) at the stuffing position while the stuffing horn of the machine is extended through the tube of the casing article.

having thus described the invention in detail, what is claimed as new is:

1. Stuffing apparatus having a longitudinal stuffing axis along which casing articles are positioned for stuffing, and having means to deliver articles toward and away from the stuffing axis, said means comprising:
 (a) a carrier having a cradle portion for receiving a shirred casing article composed of an elongated stuffing tube and a shirred casing predisposed on the stuffing tube, and for positioning the received casing article so its longitudinal axis lies substantially parallel to said stuffing axis;
 (b) means for moving said carrier from a casing article receiving position and towards said stuffing axis to locate the longitudinal axis of the received casing article substantially coincident with said stuffing axis so an end of the stuffing tube can be connected to an outlet of the stuffing apparatus, and for moving said carrier in a reverse direction away from said stuffing axis and towards said receiving position after the shirred casing on the stuffing tube has been stuffed and removed from the stuffing tube;

(c) ejector means on said carrier and spaced from said cradle portion, said ejector means being movable with respect to said carrier between an inoperative position and an operative position extending outward from said carrier and engageable against the stuffing tube;

(d) means to locate said ejector means at said operative position prior to movement of said carrier in said reverse direction, and said ejector means being maintained in said operative position to engage and transport the stuffing tube on said carrier away from the stuffing axis as said carrier moves in said reverse direction;

(e) discharge means causing the release and removal of the stuffing tube from said carrier as said carrier moves in said reverse direction away from said stuffing axis; and (f) means for moving said ejector means to said inoperative position prior to movement of said carrier in said forward direction.

2. Stuffing apparatus as in claim 1 wherein said ejector means is pivotally connected to said carrier and said ejector means having a stuffing tube engaging surface which is disposed within the boundaries of said carrier when said ejector is at said inoperative position so as not to interfere with the reception and transport of a casing article to said stuffing axis.

3. Stuffing apparatus as in claim 2 including means for moving said ejector means to said operative position responsive to the movement of said carrier towards said stuffing axis.

4. Stuffing apparatus as in claim 2 wherein said ejector means includes a cam surface and wherein a stop is positioned to engage said cam surface as said carrier moves towards said stuffing axis to thereby cam said ejector means to said operative position.

5. Stuffing apparatus as in claim 1 including cam means for moving said ejector means from said operative position to said inoperative position as said carrier moves in said reverse direction.

6. Stuffing apparatus as in claim 1 wherein said discharge means is disposed in the path of travel of the stuffing tube and is arranged for engaging and removing the stuffing tube from said carrier as said carrier moves in said reverse direction away from said stuffing axis.

7. Stuffing apparatus as in claim 1 having an outlet through which foodstuff is pumped under pressure and having a clamp member movable towards said stuffing axis, said clamp member and cradle portion cooperating to hold the received casing article therebetween and at said stuffing axis to permit the communication of said outlet to an end of the stuffing tube of the received casing article.

8. Stuffing apparatus as in claim 7 wherein said clamp member and carrier are operatively connected so that each moves towards the other and towards said stuffing axis to clamp the received casing article therebetween at said stuffing axis.

9. Stuffing apparatus as in claim 8 including means operative after the shirred casing has been stuffed and removed from the stuffing tube for moving said carrier and clamp means closer to said stuffing axis until said cradle portion and clamp means abut against the stuffing tube at said stuffing axis and thereby hold the stuffing tube therebetween to permit disconnection of said outlet from said stuffing tube end.

10. Stuffing apparatus as in claim 8 wherein said clamp member is arranged for straight line movement towards and away from said stuffing axis and said carrier is arranged for swinging movement towards and away from said stuffing axis.

11. Stuffing apparatus as in claim 10 including means for adjusting the travel distance of said clamp member towards and away from said stuffing axis.

12. Stuffing apparatus as in claim 1 including gate means for releasing casing articles to said carrier, one at a time, from a supply of the casing articles.

13. A stuffing method comprising the steps of:

(a) receiving an elongated casing article onto a carrier and supporting the article with its longitudinal axis parallel to and laterally spaced from a stuffing axis of a stuffing machine, the casing article constituting an elongated stuffing tube and a shirred casing on the tube having the pleats thereof gripping about the tube;

(b) moving the casing article transverse to its longitudinal axis from said receiving position and towards said stuffing axis until the longitudinal axis of the casing article coincides with said stuffing axis;

(c) holding the casing article at said stuffing axis and communicating an end of the stuffing tube to a stuffing outlet of the stuffing machine, and thereafter releasing the casing article from the carrier and passing foodstuff through said outlet and into the stuffing tube to stuff and remove casing from the stuffing tube;

(d) disconnecting the stuffing tube from said outlet after all the casing has been stuffed and removed from the tube;

(e) returning the stuffing tube to the carrier and moving the carrier and the stuffing tube thereon in a reverse direction away from said stuffing axis and back towards said receiving position; and (f) discarding the stuffing tube from said carrier in the course of moving the stuffing tube in said reverse direction.

14. A stuffing method as in claim 13 including the step of delivering to the carrier a casing article from a supply consisting of a plurality of the casing articles each time the carrier moves to said receiving position.

15. A stuffing method as in claim 13 wherein said holding step (c) is accomplished by clamping the casing article between opposed members one of said members being a part of the carrier.

16. A stuffing method as in claim 13 wherein said discarding step (f) is accomplished by moving said carrier by a ramp member and causing the stuffing tube to be engaged and discharged from the carrier by the ramp member.

* * * * *